United States Patent [19]
Peterson et al.

[11] Patent Number: 5,113,643
[45] Date of Patent: May 19, 1992

[54] DUST SUPPRESSION SYSTEM

[75] Inventors: Robert C. Peterson, Granite Falls; Kelly B. Pauling; Russell J. Tepfer, both of Maynard, all of Minn.

[73] Assignee: KRP Enterprises, Inc., Granite Falls, Minn.

[21] Appl. No.: 579,996

[22] Filed: Sep. 12, 1990

[51] Int. Cl.⁵ ............................................. A01D 57/00
[52] U.S. Cl. ......................................... 56/153; 56/157
[58] Field of Search ................................. 56/153–158; 427/212; 141/89–91

[56] References Cited

U.S. PATENT DOCUMENTS

| | | | |
|---|---|---|---|
| 1,434,879 | 11/1922 | Dodds . | |
| 1,612,072 | 12/1926 | Stinson . | |
| 1,997,083 | 4/1935 | Robison . | |
| 2,057,403 | 10/1936 | Vali et al. | 56/153 |
| 2,166,974 | 7/1939 | Shields . | |
| 2,212,465 | 8/1940 | Baldwin | 56/153 |
| 2,222,370 | 3/1940 | Mori . | |
| 2,243,650 | 5/1941 | Poll | 56/157 |
| 2,504,159 | 5/1946 | Singer et al. . | |
| 2,585,026 | 2/1952 | Moen et al. . | |
| 3,155,521 | 11/1964 | Ward et al. . | |
| 3,669,124 | 6/1972 | De Coene et al. | 130/27 R |
| 3,739,893 | 6/1973 | Kaufmann | 141/93 X |
| 3,827,578 | 8/1974 | Hough | 193/23 X |
| 3,915,877 | 10/1975 | Ware | 424/258 X |
| 3,953,077 | 4/1976 | Kulyabko et al. | 222/56 |
| 4,095,625 | 6/1978 | Marpe | 141/93 |
| 4,290,725 | 9/1981 | Johnson | 141/283 X |
| 4,390,090 | 6/1983 | Kossebau | 222/564 X |
| 4,558,805 | 12/1985 | Margison | 222/133 |
| 4,794,022 | 12/1988 | Johnson et al. | 427/212 |
| 4,847,067 | 7/1989 | Thomas | 424/639 |

OTHER PUBLICATIONS

Dust Free System, Inc., six-page publication disclosing a Dust Free System, dated Sep. 1990 (Exhibit A).
Star City Fabrication publication entitled "Plain Talk About the 'Dust Trappes' Oil Application Dust Control System", two pages (Exhibit B).

Primary Examiner—Thuy M. Bui
Attorney, Agent, or Firm—Merchant, Gould, Smith, Edell, Welter & Schmidt

[57] ABSTRACT

A harvester apparatus having adjust suppression system provided for suppressing grain dust during crop harvesting operations wherein the harvester apparatus has a vehicle body with a harvesting mechanism for harvesting the crops and supplying the crops to an accumulator bin on the vehicle body. A discharge apparatus is provided to empty the accumulator bin and includes an elongated housing extending from the accumulator bin and terminating in a discharge opening. An elongated auger is rotatably mounted to the vehicle body about a longitudinal axis in an interior of the tubular housing. The auger transports the crops from the accumulator bin to the discharge opening during rotation. A nozzle mounted to the elongated housing has a spray opening located in the tubular passageway. Structure is provided for supplying a dust suppressing fluid to the spray opening of the nozzle for application to the crops being transported through the elongated housing by the auger.

5 Claims, 2 Drawing Sheets

DUST SUPPRESSION SYSTEM

FIELD OF THE INVENTION

The present invention relates generally to dust suppression systems and in particular to dust suppression systems for use during crop harvesting operations on a farm.

BACKGROUND OF THE INVENTION

During crop harvesting operations on the farm, a harvester apparatus such as a combine is driven through the fields to harvest the crops. Combines typically are used to harvest grains and operate by gathering the crops and then separating the grains from the rest of the plant. The grains are collected by the combine and exit the harvester apparatus at a discharge opening. The rest of the plant is typically discarded. Sometimes during harvesting, the harvested grains are temporarily stored in the combine in a hopper or accumulator bin and then periodically unloaded via the discharge opening to a truck or other vehicle for transport from the field to a desired location for further transport, processing, storage or use. Other times during harvesting, the grain exits the accumulator bin of the combine immediately to a trailing vehicle in order to more quickly harvest the crops.

In many combines, an auger mechanism is used to unload the accumulator bin. In those combines, a rotatably mounted auger conveys the harvested grain through an elongated housing to the discharge opening located at a distal end of the housing, at which point the grain drops downward toward the ground. The transport vehicle is positioned beneath the discharge opening to catch the grain as it falls.

As the grain is unloaded from the combine apparatus and subsequently handled and processed on the farm, grain dust present in the harvested crops causes significant problems. Grain dust consists of a variety minute matter including small particles of the harvested grain, fungus, bacteria, soil particles, agricultural chemicals, pollens and other parts of the plants, and other debris from the environment. Grain dust is a common problem when harvesting corn, soy beans, wheat, barley, and other small grains. Anytime the crops are handled, such as when the crops are unloaded from the combine, the grain dust has a tendency to become airborne.

When the grain dust becomes airborne, the dust causes several significant problems. First, the grain dust poses significant health hazards to the harvester operators and the other farm workers who come in contact with the dust. In particular, emphysema, asthma and other respiratory problems may result or be exacerbated. The grain dust also increases clean-up time and increases equipment maintenance time and costs because of increased wear on the moving parts caused by the dust. The grain dust also causes problems when the crops are air dried on the farm with moving air because the dust reduces air flow through the dryer by more rapidly clogging the filters and screens. Further, airborne pieces of the harvested grain result in a loss of harvest.

Various dust suppression systems have been used in the past in connection with material handling systems when dust is a problem. One known method of suppressing dust is to apply a fluid to the material to keep the dust from becoming airborne. Previously, dust suppression systems employing fluids have been used in connection with bulk storage systems for grain, specifically large commercial grain elevators, to reduce grain dust. Large commercial grain elevators are typically frequently filled and emptied, creating airborne dust during each operation. The dust suppression systems used in connection with grain elevators are provided primarily to reduce the likelihood of grain dust explosions and fires.

While the problem of grain dust in connection with grain elevators and other bulk storage systems for grain has been addressed in the past, the problem of grain dust at the farm level of the harvesting operation is a continuing one. Previously, one way the problem of rain dust has been dealt with on the farm was to improve the operator compartments or cabs on the combine apparatus to make them dust-tight. However, this solution only kept dust from certain areas on the harvester and did not suppress the dust itself. The present invention addresses the above problems of grain dust occurring at the farm level.

SUMMARY OF THE INVENTION

The present invention relates to a dust suppression system for use on a harvester apparatus for suppressing dust during harvesting and handling of the crops on the farm. The harvester apparatus includes a vehicle body with structure mounted to the vehicle body for harvesting the crops in the field. Preferably, the harvesting structure also places the harvested crops into an accumulator bin mounted to the vehicle body. The harvester apparatus includes structure for transporting the harvested crops to a discharge opening from the harvester apparatus. In the preferred embodiment, an elongated housing with an auger rotatably mounted in a tubular passageway transports the harvested crops from the accumulator bin to the discharge opening. During transportation of the harvested crops to the discharge opening, grain dust in the harvested crops has a tendency to become airborne. The dust suppression system is provided on the harvester apparatus to suppress airborne grain dust by applying a dust suppressing fluid t the harvested crops.

In the preferred embodiment, the dust suppression system includes a fluid application system having a nozzle mounted to the elongated housing with a spray opening located in the tubular passageway. Structure is further provided on the harvester apparatus to supply the dust suppressing fluid to the nozzle for application to the harvested crops during transport by the auger. Preferably, a fluid reservoir, a pump, and a plurality of hoses are provided to supply the nozzle with fluid. In the preferred embodiment the dust suppressing fluid is an oil such as food grade vegetable oil or mineral oil.

In the preferred embodiment, the dust suppressing system includes a recirculating system as part of the fluid application system to prevent the fluid from getting thick in colder air temperature, as in the case of vegetable oil. The recirculating system conveys more fluid through the fluid application system than exits through the nozzle. The fluid that does not exit the nozzle is recirculated back through the fluid application system.

The present invention also relates to a method of suppressing dust during harvesting operations wherein a harvester apparatus is provided having a harvester mechanism, an accumulator bin for the harvested crops, and a discharge opening from the harvester apparatus to exit the harvested crops from the harvester apparatus. The method also comprises the steps of harvesting the crops in the field with the harvester mechanism, placing the crops into the accumulator bin, conveying the crops to the discharge opening, and spraying the crops with a dust suppressing fluid as the crops are being conveyed from the accumulator bin to the discharge opening.

BRIEF DESCRIPTION OF THE DRAWINGS

In the drawings, wherein like reference numerals generally indicate corresponding parts throughout the several views.

DETAILED DESCRIPTION OF THE PREFERRED EMBODIMENT

Figure 1:
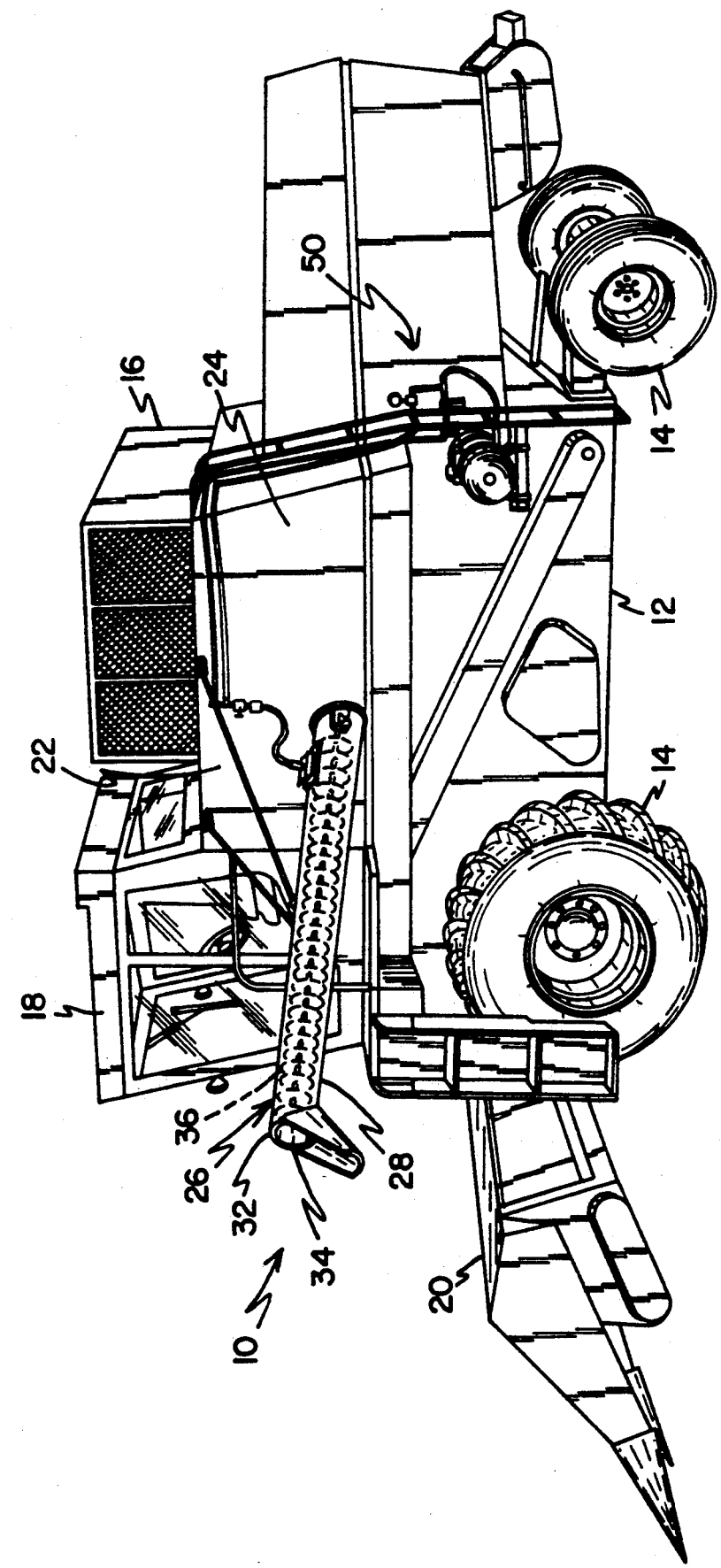
FIG. 1 is a perspective view of a harvester apparatus having a fluid application system according to the present invention.
Figure 2:
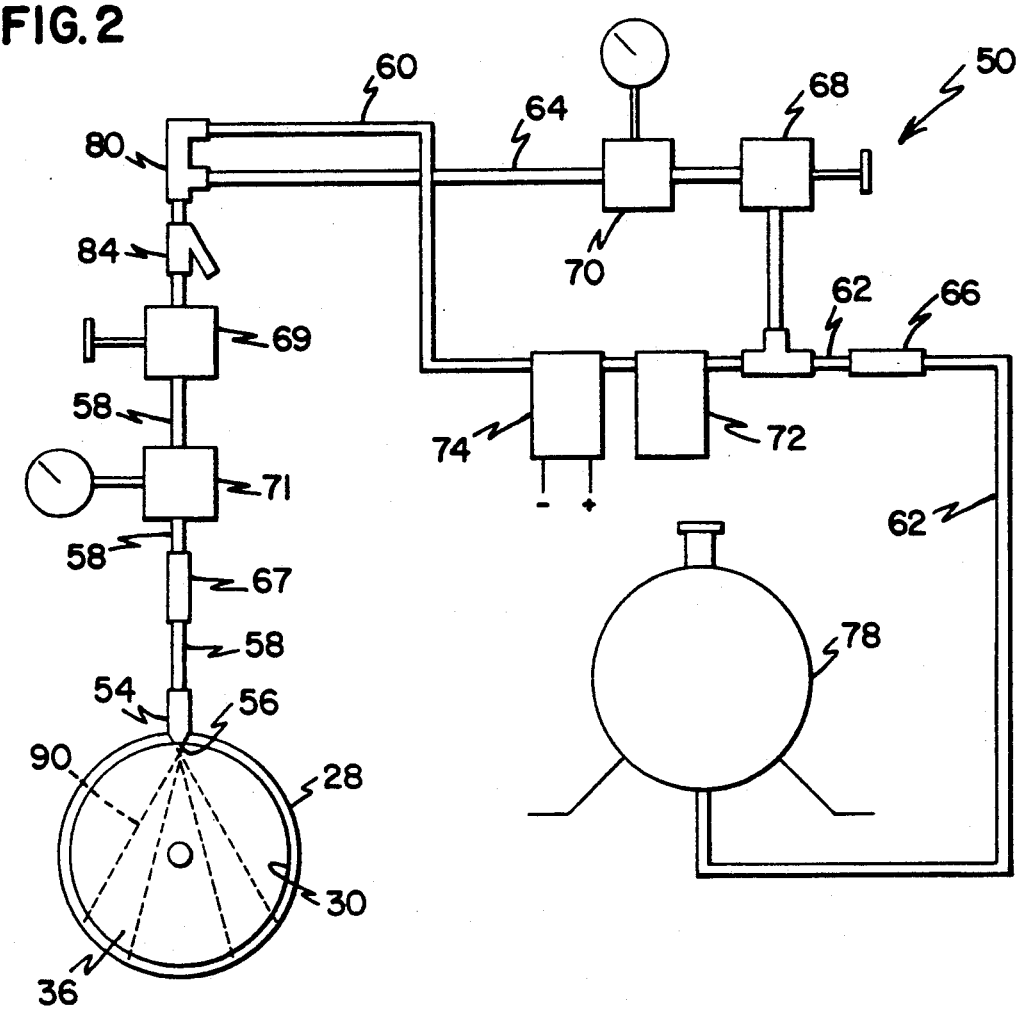
FIG. 2 is an enlarged portion of the harvester apparatus shown in FIG. 1 showing the fluid application system in greater detail.
Figure 3:
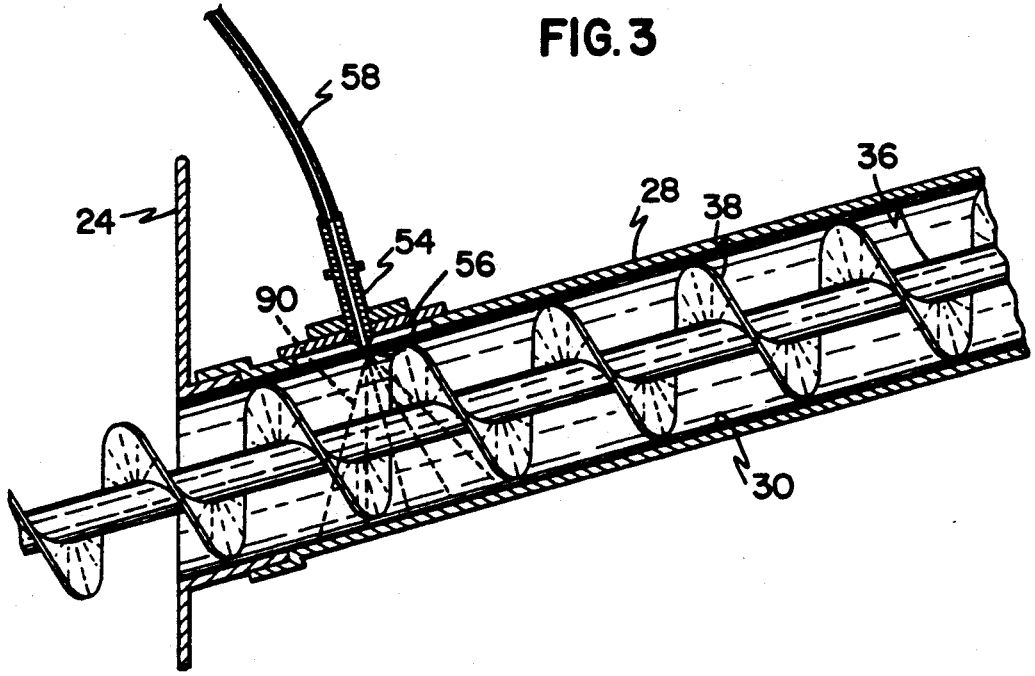
FIG. 3 is a partial cutaway view of a portion of the auger of the harvester apparatus shown in FIG. 1 during operation.

Referring now to FIGS. 1 through 3, a harvester apparatus or harvester 10 is shown according to the principles of the present invention. In the preferred embodiment, the harvester 10 is a conventional combine used to harvest crops such as corn, soy beans, wheat, barley, or other small grains. However, it is anticipated that the harvester 10 of the present invention could be any type of harvesting apparatus used to harvest any of a wide variety of crops in the field. As best shown in FIG. 1, the harvester 10 generally includes a vehicle body 12, a plurality of ground engaging wheels 14, an engine 16, and an operator compartment or cab 18.

The harvester 10 also includes a harvester mechanism 20 located adjacent the front of vehicle body 12. The harvester mechanism 20 gathers the growing crops in the field as the harvester 10 is guided through the field. In the preferred embodiment, the harvester mechanism 20 also separates the grains from the rest of the plant. The rest of the plants are discarded out the rear of the harvester 10. The harvested grain is placed in a hopper or accumulator bin 22 provided on harvester 10 having walls 24. The accumulator bin 22 provides a compartment on the harvester 10 having sufficient capacity for temporary storage of the harvested crops during the harvesting operation if desired.

An unloading mechanism 26 is provided on the harvester 10 to empty the harvested grain from the accumulator bin 22. In the preferred embodiment, the unloading mechanism 26 includes an elongated housing 28 which extends from one of the walls 24 of the accumulator bin 22 and terminates in a distal end 32 having a discharge opening 34. The unloading mechanism 26 empties the contents of the accumulator bin 22 via the discharge opening 34 to a truck or other vehicle for transport to a desired location for further transport, for processing, for storage, or for use. It should be noted that the elongated housing 28 is typically pivotally mounted to the vehicle body 12 of the harvester 10 such that the elongated housing 28 may be pivoted to a position in substantial conformity with the vehicle body 12. Then, during the unloading operation, the elongated housing 28 is pivoted back to a position generally transverse to the vehicle body 12 into the position shown in FIG. 1. Other conventional combines are known having unloading mechanisms which exit adjacent the top of the harvester 10 as opposed to the side, as is illustrated in FIG. 1.

The structure comprising the unloading mechanism 26 for transporting the harvested crops to the discharge opening 34 to exit the harvester 10 preferably includes a screw mechanism or auger 36. The auger is rotatably mounted to the vehicle body 12 about a longitudinal axis of the auger and is located within a tubular passageway 30 of the elongated housing 28. During rotational movement of the auger 36, rotating threads 38 of the auger 36 transport the harvested crops from the accumulator bin 22 to the discharge opening 34.

During the unloading operation, grain dust in the harvested grain has a tendency to become airborne as the grain exits the discharge opening 34. The harvester operator, the transport vehicle operator, and any other farm workers nearby are exposed to the dust. Further, the harvesting equipment and grain handling equipment will be exposed to the dust and crop losses will result. The grain dust will also be a problem during any subsequent handling on the farm. In order to suppress dust during handling of the grain during the harvesting operation, a fluid application system 50 is provided on harvester 10 to apply a dust suppressing fluid to the grain before the grain exits harvester 10. The fluid provides a medium to adhere the dust to the grain to reduce the amount of airborne dust. In the preferred embodiment, the fluid in the fluid application system 50 is vegetable oil such as corn oil or soy oil. In some instances, mineral oil may be used instead. These are preferably food grade oils which are generally safe for human and livestock consumption. In some cases, some fluids, such as mineral oil, may be governed by laws specifying maximum limitations on the amount of fluid that may be used for a given quantity of grain.

In the preferred embodiment of harvester 10, the fluid application system 50 includes a nozzle 54 mounted to the elongated housing 28 of the unloading mechanism 26. The nozzle 54 includes a spray opening 56 located in the tubular passageway 30. In the preferred embodiment, the nozzle 54 is made of brass with a stainless steel pin which facilitates spraying of the fluid in a hollow cone shape. A cone-shaped spray is believed to be more advantageous in this usage over other spray shapes such as fan-shaped sprays, since the cone shaped spray produces a more uniformly applied fluid. Preferably the nozzle 54 is mounted adjacent a top surface of the auger housing 28 such that the spray opening 56 is positioned above the auger 36. Structure is further provided to supply the nozzle 54 with a dust suppressing fluid which is sprayed through the spray opening 56 onto the grain as the grain is transported by the auger 36 through the tubular passageway 30.

As best shown in FIG. 2, the structure for supplying the nozzle 54 with fluid includes a reservoir 78 mounted to the harvester 10 for holding a ready supply of the dust suppressing fluid. In the preferred embodiment, the reservoir 78 is a 15 gallon cylindrical metal tank having a filtered breather cap. A pump 74 is provided to transport the fluid from the reservoir 78 to the nozzle 54. In addition, the pump 74 pressurizes the fluid to facilitate spraying from the spray opening 56. In the preferred embodiment, the pump 74 includes an enclosed 12 volt DC, ½ horsepower motor of the continuous duty type and having a 1750 rpm capability. The pump 74 of the preferred embodiment has the motor mechanically driving, via a shaft, an enclosed hydraulic gear pump having a 94 gal/hr. capability.

A first hose 60 and a second hose 62 are provided wherein the first hose 60 connects the pump 74 to a nozzle hose 58 attached to the nozzle 54 and the second hose 62 connects the reservoir 78 to the pump 74. In the preferred embodiment, the first hose 60 and the second hose 62 are ¼ inch steel braided hose having a 2500 psi capability. The nozzle hose is preferably of a similar type of a ¼ inch size.

In the preferred embodiment, the fluid application system further includes a recirculating hose 64 connecting the first hose 60 back to the second hose 62. The recirculating hose 64 and the first hose 60 connect with a three-way fitting. With the recirculating hose 64 present, a portion of the fluid from the pump 74 travels through the nozzle hose 58 to the nozzle 54 and a portion is recirculated back to the pump 74 through the recirculating hose 64. The recirculating feature prevents the fluid from getting too thick at colder temperature to extend the range of operation. In the preferred embodiment, valving is provided to maintain a higher pressure in the first hose 60 and second hose 62 than in the nozzle hose 58. For example, the recirculating feature is useful in the case of soy oil which typically becomes thick at 30° F. In that case, if the nozzle line pressure is maintained between 25 and 50 pounds per square inch (psi), as indicated on pressure gauge 71, and the recirculating pressure is maintained at approximately 150 psi, as indicated on pressure gauge 70, the oil will recirculate such that the cold air temperature limit of operation can be lowered from 30° F. to approximately 0° F.

As best shown in FIG. 2, the fluid application system 56 includes several conventional fluid handling devices including check valves 66, 67, manual valves 68, 69, and pressure gauges 70, 71 to control and monitor the fluid in the system. The devices are also used to calibrate the fluid application system 56 to apply the desired amount of fluid to the grain. Spray opening size of the nozzle 54 may also be changed to vary the amount of fluid applied. In the preferred embodiment, a filter 72 and a Y strainer 84 are provided to filter the fluid. The harvester battery (not shown) is connected by wires (not shown) to the pump 74 to power the pump 74. A switch connected through wires (not shown) controls the operation of the pump 74 and may be conveniently located in the cab 18 of the harvester 10.

FIG. 3 illustrates portions of the unloading mechanism 26 and the fluid application system 50 of the harvester 10 during operation. The rotating auger 36 transports grain from the accumulator bin 22 through the tubular passage 30 of the elongated housing 28 toward the discharge opening 34. Oil 90 in the fluid application system 50 passes through the nozzle hose 58 and through the nozzle 54 to exit through the discharge opening 34 in a fine mist into the tubular passage 30.

In the preferred embodiment, one to one and sixtenths gallons of oil are applied per 1000 bushels of grain. It is believed that this amount is effective for suppressing dust without causing problems for the equipment or causing the grain to stick together. As noted above, the fluid application system 50 can be calibrated by varying the size of the spray opening 56 of the nozzle 54. The fluid application system 50 may also be calibrated by adjusting the pressure in the nozzle hose 58 by adjusting the manual valve 71. Calibration may be necessary when initially mounting the dust suppression system to the harvester 10. Calibration may also be necessary to change the amount of oil being applied should the fluid applications system conditions change or the grain handling conditions change.

As the grain exits the harvester 10 at the discharge opening 34, the amount of airborne grain dust is significantly reduced by the fluid application system 50. Tests have indicated that approximately a 70% or greater reduction of the grain dust is possible. Since the oil adheres to the grain and will not evaporate away, the grain dust is also suppressed during subsequent handling of the grain on the farm.

It is anticipated that the fluid application system 50 of the present invention has applications to harvesting operations in the farm other than in connection with the harvester 10. For example, the fluid application system may be mounted to a portable auger used to transport grain from one location to another. When used with a portable auger, the nozzle is mounted in a similar location to the auger 36 of harvester 10 in the preferred embodiment. Another example of a possible use for the fluid application system on the farm is in connection with a portable feed mill to suppress grain dust associated the operation of the feed mill. While these other uses of the fluid application system will suppress dust, it is believed that the use of the fluid application system 50 in connection with the harvester 10 is particularly advantageous because dust is suppressed at a point early in the harvesting operation when dust first becomes a significant problem.

It is to be understood, that even though numerous characteristics and advantages of the invention have been set forth in the foregoing description, together with details of the structure and the function of the invention, the disclosure is illustrative only, and changes may be made in detail, especially in matters of shape, size, and arrangement of the parts within the principles of the invention to the full extent indicated by the broad, general meaning of the term in which the appended claims are expressed.

What is claimed is:

1. A mobile combine harvester apparatus for harvesting grains and suppressing dust associated with the harvested grains, the mobile combine harvester apparatus comprising:

a combine vehicle body;

means mounted to the combine vehicle body for harvesting the grains and supplying the grains to an accumulator bin on the combine vehicle body;

an accumulator bin mounted to the combine vehicle body receiving the harvested grains; and a grain discharge apparatus mounted to the combine vehicle body including:

an elongated housing extending from the accumulator bin and terminating at a discharge opening, the elongated housing having a tubular inner passageway connecting the accumulator bin to the discharge opening;

an elongated auger rotatably mounted within the tubular passageway about a longitudinal axis, the auger transporting the grains from the accumulator bin to the discharge opening during rotation of the auger;

a nozzle mounted to the elongated housing, the nozzle terminating in a spray opening located in the tubular passageway; and means mounted to the combine vehicle body for supplying dust suppressing fluid to the spray opening of the nozzle, the fluid applied to the grains being transported through the elongated housing to exit the combine harvester apparatus at the discharge opening wherein dust associated with the harvested grains is suppressed, the means for supplying dust suppressing fluid including a pump, a fluid reservoir, a first hose connecting the pump to the nozzle, and a second hose connecting the fluid reservoir to the pump.

2. The mobile combine harvester apparatus of claim 1, wherein the means for supplying fluid further includes a recirculating hose connecting the first hose back to the second hose.

3. The mobile combine harvester apparatus of claim 2, further comprising a manual valve located between the nozzle and the connection point of the first hose and the recirculating hose, the manual valve varying the flow of fluid exiting the nozzle at the spray opening.

4. The mobile combine harvester apparatus of claim 1, wherein the spray opening is disposed substantially vertically above the longitudinal axis of the auger.

5. A method of suppressing dust during crop harvesting operations comprising the steps of:

providing a mobile combine harvester apparatus having a harvester mechanism, an accumulator bin receiving the crops harvested by the harvester mechanism, and a discharge auger mechanism to empty the harvested crops from the accumulator bin, the discharge auger mechanism including a rotatable auger, the discharge auger mechanism terminating in a discharge opening;

harvesting the crops with the harvester mechanism of the mobile combine harvester apparatus;

placing the harvested crops in the accumulator bin of the mobile combine harvester apparatus;

rotating the auger of the discharge auger mechanism to convey the crops from the accumulator bin to the discharge opening to exit the crops from the mobile combine harvester apparatus; and spraying the crops being conveyed through the discharge auger mechanism with dust suppressing fluid before the crops exit from the discharge opening of the mobile combine harvester apparatus.

* * * * *